United States Patent [19]

Aksoy et al.

[11] Patent Number: 5,300,372
[45] Date of Patent: Apr. 5, 1994

[54] RECHARGEABLE CELL OR CELL PACK CONTACT CONFIGURATION

[75] Inventors: Adnan Aksoy, Boca Raton; Mark S. Bresin, Coral Springs, both of Fla.

[73] Assignee: Motorola, Inc., Schaumburg, Ill.

[21] Appl. No.: 966,487

[22] Filed: Oct. 26, 1992

[51] Int. Cl.⁵ .............................................. H01M 2/34
[52] U.S. Cl. ........................................ 429/65; 429/99; 429/178
[58] Field of Search ..................... 429/65, 99, 159, 178

[56] References Cited

U.S. PATENT DOCUMENTS

| | | | |
|---|---|---|---|
| 2,416,079 | 2/1947 | Anthony | 429/159 |
| 3,558,356 | 1/1971 | Jost | 136/6 |
| 3,994,749 | 11/1976 | Decker | 429/53 |
| 4,317,497 | 3/1982 | Alt et al. | 429/99 X |
| 4,920,018 | 4/1990 | Turner | 429/65 |

Primary Examiner—Stephen Kalafut
Attorney, Agent, or Firm—Pablo Meles; Leslie A. Rhyne

[57] ABSTRACT

A consumer insertable battery pack assembly (70) comprises a plurality of substantially parallelipiped shaped rechargeable cells (61, 62, and 63) having a positive terminal (68) and a negative terminal (66). The positive terminal of one cell is coupled to the negative terminal of an adjacent cell. Insulation (17) is used on at least one of the terminals of the cells to offset the terminal location to prevent the charging of consumer insertable primary cells. The cells are within a housing (74) having contacts (76 and 86) for charging being arranged and constructed to mate with the offset terminals (68 and 66 respectively) of the cells. In this manner, the cells are unable to mate with the terminals of consumer inserted primary cells having centrally located terminals.

15 Claims, 2 Drawing Sheets

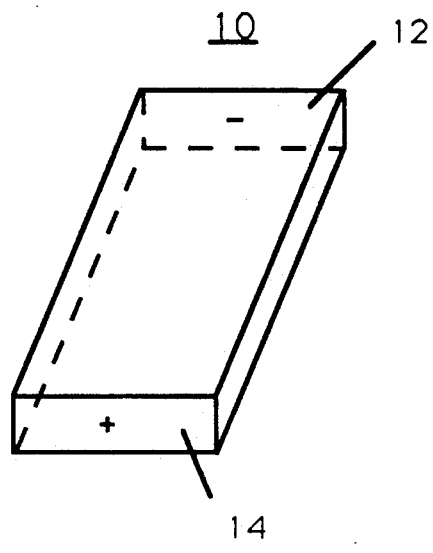
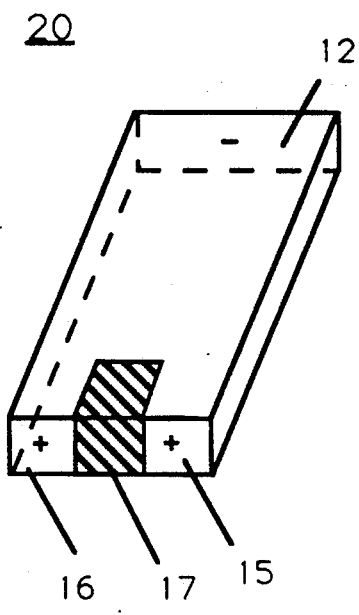
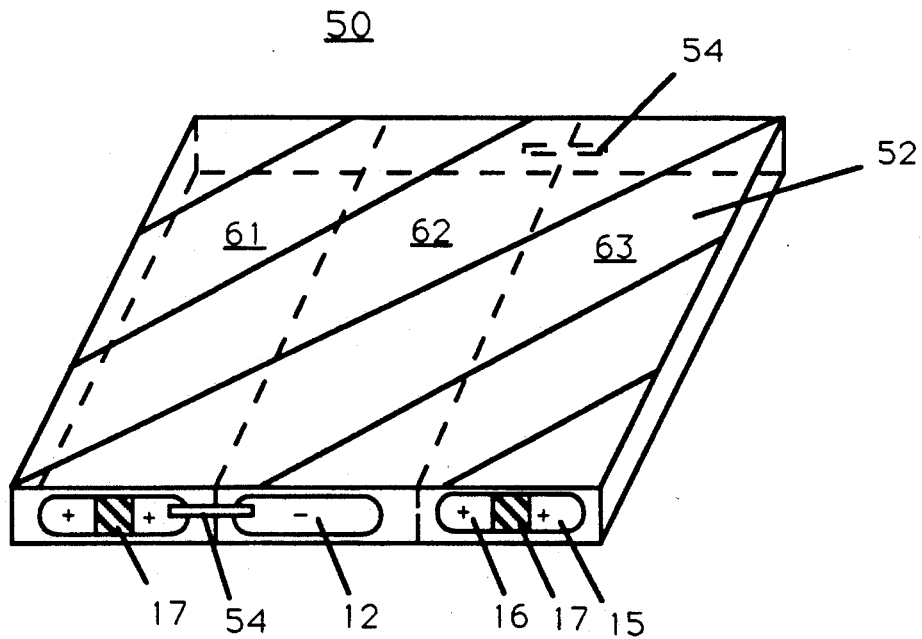

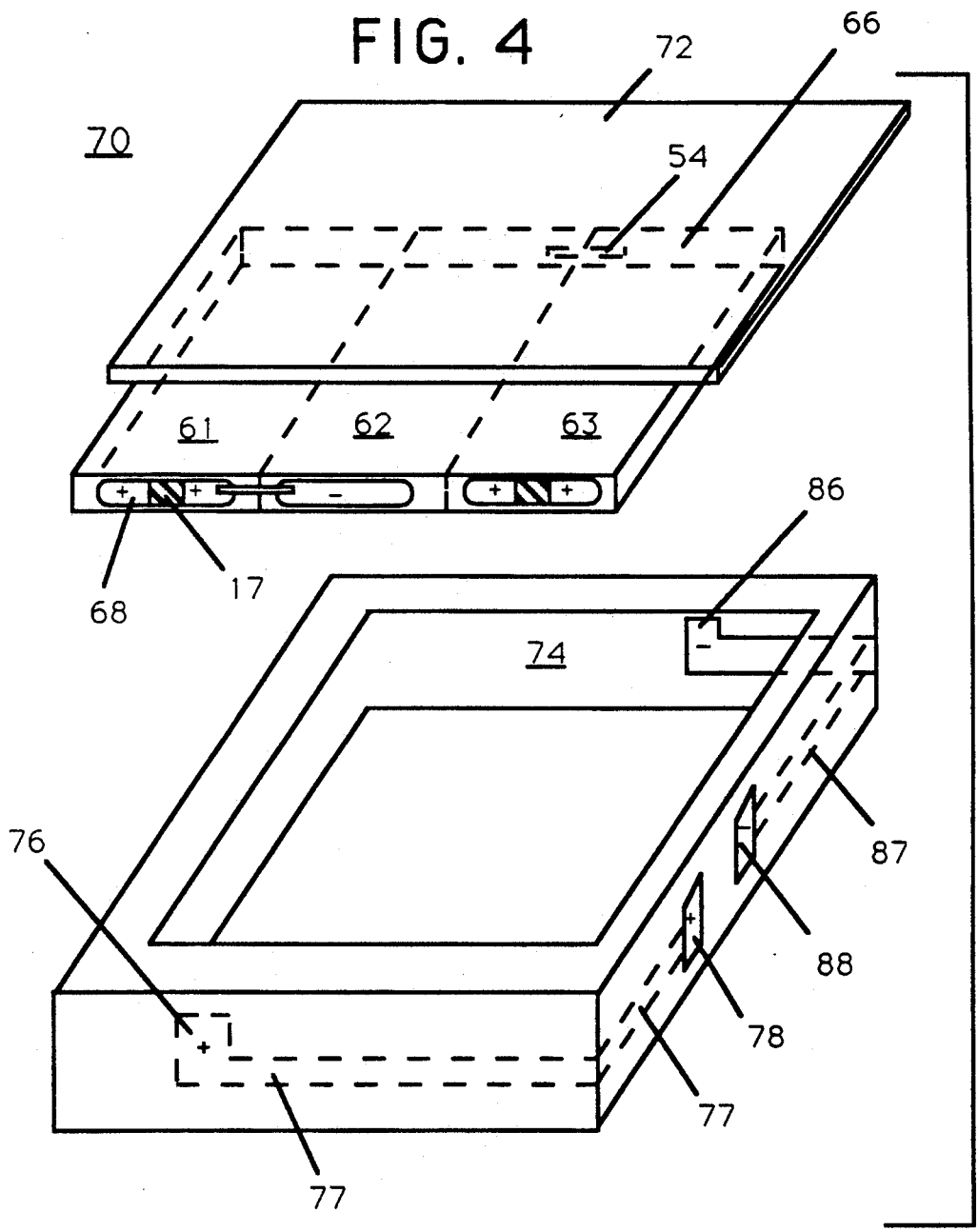

RECHARGEABLE CELL OR CELL PACK CONTACT CONFIGURATION

TECHNICAL FIELD

This invention relates generally to rechargeable cells in general and particularly to a contact assembly for a rechargeable cell or cell pack.

BACKGROUND

Consumer insertable cells or pre-packaged cells wrapped in shrink wrap typically have cell terminals with centrally disposed contact areas. For instance, a positive terminal in many cylindrical cells and even prismatic cells have bumped out contact areas that are centrally disposed while the negative contact terminal covers the entire surface of an opposing end of the cell. If a manufacturer of a consumer portable product provides a rechargeable cell or cell pack for their product, the manufacturer must be careful to prevent the charging of non-rechargeable cells or primary cells. Presently, most rechargeable and non-rechargeable cells physically fit into the same charger assembly, presenting a hazard to the consumer and liability to the manufacturer.

A product having a pre-packaged rechargeable cell pack or pre-packaged rechargeable battery pack usually has power contacts to power the product and charger contacts for charging the battery or cell pack. A battery pack having primary cells usually does not have charger contacts because charging many primary cells such as alkaline cells is hazardous. Consumer insertable rechargeable cells are inserted into a charger just as easily as a primary cell. The only thing preventing a consumer from inserting a non-rechargeable cell into a charger is a warning label. Therefore, a need exists to physically alter rechargeable cells and their respective chargers to only allow the charging of the rechargeable cells and prevent the recharging of typical consumer inserted non-rechargeable cells or primary cells.

SUMMARY OF THE INVENTION

A rechargeable cell contact configuration for consumer insertable cells comprises a substantially parallelipiped shaped rechargeable cell having a positive terminal and a negative terminal and insulation applied to at least one of the terminals to off-set the terminal differently from consumer inserted cells.

BRIEF DESCRIPTION OF THE DRAWINGS

FIG. 1 is a perspective view of a cell to be used in accordance with the present invention.

FIG. 2 is a perspective view of a cell in accordance with the present invention.

FIG. 3 is a perspective view of a cell pack in accordance with the present invention.

FIG. 4 is an exploded perspective view of a cell pack in a housing in accordance with the present invention

DETAILED DESCRIPTION OF THE PREFERRED EMBODIMENT

Referring to FIG. 1, there is shown a rechargeable cell 10, preferably in the form of a prismatic cell. The cell 10 is preferably a substantially parallelipiped shaped form having one end as a positive terminal 14 and an opposing end as a negative terminal 12. The cell 10 preferably has a flat positive terminal rather than the typical pronounced tip found in consumer batteries.

Referring to FIG. 2, the cell 20 in accordance with the present invention further includes insulation means 17 applied to one of the terminals of the cell to offset the location of the terminal from those of consumer inserted cells which have centrally located terminals. The insulation means could be any form of masking or insulating material preventing electrical contact with the predetermined area of the cell terminal, preferably the positive terminal. The insulation 17 leaves two remaining areas 16 and 15 of the positive terminal exposed. It is within contemplation of the present invention that the cell 10 or 20 could be nickel metal hydride, nickel cadmium, lithium ion, zinc air, lead acid or of any cell chemistry.

Referring to FIG. 3, there is shown a perspective view of a cell pack 50 having a plurality of the rechargeable cells (61, 62, and 63). The cells 61, 62, and 63 are again preferably prismatic cells substantially parallelipied shaped. A coupling means 54, preferably metal or steel straps couples the positive terminal of one cell with the negative terminal of an adjacent cell as shown. The coupling means 54 could also be made of nichrome strips so as to further provide protection from shorting and otherwise hazardous conditions. The three cells (61, 62, and 63) are preferably formed into a "pack" by using shrink wrapping 52 about the three cells.

Referring to FIG. 4, there is shown the cell pack 50 of FIG. 3 in an electronic product housing assembly 70. The housing assembly could be a battery pack housing itself or part of a portable electronic product such as a two-way radio, pager or computer. The assembly 70 comprises a plurality of substantially parallelipiped shaped rechargeable cells (61, 62, and 63) having a positive terminal 54 and a negative terminal 68 for coupling to respective terminals 76 and 86 in a housing 74. The terminals 76, 86 in the housing assembly 70 are connected by circuit lines 77, 87, respectively, to terminals 78, 88 for connection to a charger (not shown). A cover 72 is placed over the cells. The cells have means (17) for preventing the charging of consumer insertable primary cells by applying insulation on at least one of the terminals of the cells to offset the terminal location. The cells reside within the housing 74 which has contacts for charging (76 and 86) and are arranged and constructed to mate with the offset terminals of the cells (68 and 66 respectively). In this manner, the cell or cell packs of the present invention are unable to mate with the terminals of consumer inserted primary cells.

What is claimed is:

1. A rechargeable battery cell having a contact configuration, comprising:
   a substantially prismatic shaped rechargeable cell having a positive terminal and a negative terminal;
   said positive and negative terminals each being flat and each substantially covering an end of the cell; and
   masking means applied to at least one of the terminals to prevent a portion of the terminal from being able to make electrical contact.

2. The rechargeable battery cell contact configuration of claim 1, wherein the rechargeable battery cell is a parallelipiped shaped cell.

3. The rechargeable battery cell contact configuration of claim 1, wherein the rechargeable battery cell is selected from the group consisting of nickel metal hydride, nickel cadmium, lithium ion, zinc air, and lead acid.

4. A battery pack having a rechargeable battery including a cell contact configuration, comprising:
   a plurality of substantially prismatic shaped rechargeable cells having a positive terminal and a negative terminal;
   said positive and negative terminals each being flat and each substantially covering an end of the cells;
   coupling means for coupling the positive terminal of one cell to the negative terminal of another cell adjacent thereto; and
   masking means applied to at least one of the terminals to prevent a portion of the terminal from being able to make electrical contact.

5. The battery pack of claim 4, wherein the coupling means comprises metal straps coupled between adjacent cells.

6. The battery pack of claim 4, wherein the masking means applied to at least one of the terminals of the cells is substantially centrally disposed on the cell terminal.

7. The battery pack of claim 4, wherein the rechargeable cell is a parallelipiped shaped cell.

8. The battery pack of claim 4, wherein the rechargeable cell is selected from the group consisting of nickel metal hydride, nickel cadmium, lithium ion, zinc air, and lead acid.

9. The battery pack of claim 4, wherein the configuration further includes shrink wrapping around the plurality of cells.

10. A consumer insertable battery pack assembly, comprising:
    a plurality of substantially prismatic shaped rechargeable cells having a positive terminal and a negative terminal;
    coupling means for coupling the positive terminal of one cell to the negative terminal of another cell adjacent thereto;
    means for preventing the charging of the cells comprising insulation on at least one of the terminals of the cells to offset the terminal location; and
    a housing having contacts for charging being arranged and constructed to mate with the offset terminals of the cells.

11. The battery pack assembly of claim 10, wherein the coupling means comprises metal straps coupled between adjacent cells.

12. The battery pack assembly of claim 10, wherein the insulation applied to at least one of the terminals of the cells is substantially centrally disposed on the cell terminal.

13. The battery pack assembly of claim 10, wherein the rechargeable cells are parallelipiped shaped cells.

14. The battery pack assembly of claim 10 wherein the rechargeable cell is selected from the group consisting of nickel metal hydride, nickel cadmium, lithium ion, lithium air, and lead acid.

15. The battery pack assembly of claim 10, wherein the battery pack further includes shrink wrapping around the plurality of cells.

* * * * *